(12) United States Patent
Dai

(10) Patent No.: US 11,418,049 B2
(45) Date of Patent: Aug. 16, 2022

(54) WIRELESS CHARGING/DISCHARGING METHOD AND WIRELESS CHARGING AND DISCHARGING DEVICE

(71) Applicant: HUAWEI TECHNOLOGIES CO., LTD., Guangdong (CN)

(72) Inventor: Renjun Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 16/467,464

(22) PCT Filed: Dec. 7, 2016

(86) PCT No.: PCT/CN2016/108916
§ 371 (c)(1),
(2) Date: Jun. 6, 2019

(87) PCT Pub. No.: WO2018/103021
PCT Pub. Date: Jun. 14, 2018

(65) Prior Publication Data
US 2020/0083737 A1    Mar. 12, 2020

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/342* (2020.01); *H02J 50/10* (2016.02); *H02J 50/20* (2016.02); *H02J 50/40* (2016.02); *H02J 50/80* (2016.02)

(58) Field of Classification Search
CPC .. H02J 50/12; H02J 50/80; H02J 7/025; H02J 50/10; H02J 50/90; H02J 7/00034;
(Continued)

(56) References Cited

U.S. PATENT DOCUMENTS

| 2011/0167187 A1 | 7/2011 | Crumlin et al. |
| 2011/0279226 A1 | 11/2011 | Chen et al. |

(Continued)

FOREIGN PATENT DOCUMENTS

| CN | 103296705 A | 9/2013 |
| CN | 103491525 A | 1/2014 |

(Continued)

OTHER PUBLICATIONS

Office Action issued in Japanese Application No. 2019-530398 dated Jun. 23, 2020, 8 pages (with English translation).

(Continued)

*Primary Examiner* — Binh C Tat
(74) *Attorney, Agent, or Firm* — Fish & Richardson P.C.

(57) ABSTRACT

Example charging methods are described. One example method includes determining that a second electronic device is wirelessly connected with a first electronic device. The first electronic device is charged using the second electronic device, in a wireless charging receiving mode of the first electronic device, when the second electronic device is a wireless charging cradle device. Charging current is provided to the second electronic device, in a wireless charging cradle mode of the first electronic device, when the second electronic device is a wireless charging receiving device. The first electronic device can be used both as a wireless charging receiving device to receive electric energy provided by a wireless charging cradle device, and as a wireless charging cradle device to provide charging current to a second electronic device.

17 Claims, 7 Drawing Sheets

(51) Int. Cl.
  *H02J 50/80* (2016.01)
  *H02J 50/10* (2016.01)
  *H02J 50/20* (2016.01)
  *H02J 50/40* (2016.01)
  *H02J 7/34* (2006.01)

(58) Field of Classification Search
  CPC .... H02J 7/02; H02J 50/40; H02J 50/60; H02J 50/70; H02J 50/005; H02J 50/402; H02J 50/50; H02J 7/00; H02J 50/00; H02J 7/00045; H02J 7/00308; H02J 7/0042; H02J 50/20; H02J 13/00001; H02J 13/0096; H02J 3/02; H02J 7/00036; H02J 7/00047; H02J 7/0047; H02J 7/0068; H02J 7/342; H02J 2310/22; H02J 7/00304; H02J 7/00712; H02J 7/04; H04B 5/0037; H04B 5/0031; H04B 5/0081; H04B 5/0025; G01R 23/02; G01R 27/26
  USPC .................................................. 320/106–115
  See application file for complete search history.

(56) References Cited

U.S. PATENT DOCUMENTS

| | | | | |
|---|---|---|---|---|
| 2013/0109371 A1* | 5/2013 | Brogan | ................ | G06F 1/1684 455/420 |
| 2015/0015741 A1* | 1/2015 | Kim | .................. | H04N 5/23293 348/239 |
| 2015/0137743 A1 | 5/2015 | Lu | | |
| 2016/0056647 A1* | 2/2016 | Choi | ..................... | H01R 13/73 320/107 |
| 2016/0198321 A1 | 7/2016 | Dai | | |
| 2016/0250099 A1* | 9/2016 | Eim | ........................ | A43B 7/00 36/141 |
| 2017/0165843 A1* | 6/2017 | Lee | ...................... | G06K 9/3216 |
| 2018/0288208 A1* | 10/2018 | Lee | ..................... | H04M 1/7246 |

FOREIGN PATENT DOCUMENTS

| | | |
|---|---|---|
| CN | 103762695 A | 4/2014 |
| CN | 104659846 A | 5/2015 |
| EP | 2512001 A2 | 10/2012 |
| EP | 2894761 A1 | 7/2015 |
| JP | 2011061893 A | 3/2011 |
| JP | 2014023298 A | 2/2014 |
| JP | 2015061468 A | 3/2015 |
| WO | 2010040015 A2 | 4/2010 |

OTHER PUBLICATIONS

PCT International Search Report and Written Opinion in International Application No. PCT/CN2016/108916, dated Jun. 28, 2017, 22 pages (With English translation).

Extended European Search Report issued in European Application No. 16923165.1 dated Oct. 22, 2019, 9 pages.

* cited by examiner

WIRELESS CHARGING/DISCHARGING METHOD AND WIRELESS CHARGING AND DISCHARGING DEVICE

CROSS-REFERENCE TO RELATED APPLICATIONS

This application is a National Stage of International Application No. PCT/CN2016/108916, filed on Dec. 7, 2016, which is hereby incorporated by reference in its entirety.

TECHNICAL FIELD

Embodiments of the present invention relate to the charging/discharging field, and in particular, to a wireless charging/discharging method and a wireless charging and discharging device.

BACKGROUND

With wireless electromagnetic induction, wireless charging becomes popular among increasingly more users because wireless charging is invisible, has a low device wear rate, is high-tech, is easy to operate, and so on. Therefore, more manufacturers are engaged in development of wireless charging receiving devices to attract customers.

Currently, a growing quantity of manufacturers develop devices that support wireless charging, for example, a mobile phone, a wristband, and a portable device that have a wireless charging function.

However, currently a receive end device that supports wireless charging in the industry can only receive electric energy, but cannot output wireless electric energy. If a user goes out with two devices that support a wireless charging function, when one device runs out of power, only a wireless charging cradle can be used to charge the device that runs out of power, and this causes inconvenience to the user.

SUMMARY

Embodiments of the present invention provide a wireless charging/discharging method and a wireless charging and discharging device, and a charging and discharging device in the method can receive electric energy and can also provide electric energy to another electronic device, so as to improve user experience.

According to a first aspect, a wireless charging and wireless discharging method is provided, and the method includes: determining that an electronic device wirelessly connected with the wireless charging and wireless discharging device; charging the wireless charging and wireless discharging device using the wireless charging cradle device, in a wireless charging receiving mode of the wireless charging and wireless discharging device, when the electronic device is a wireless charging cradle device; and providing charging current to the wireless charging receiving device in a wireless charging cradle mode of the wireless charging and wireless discharging device when the electronic device is a wireless charging receiving device. Therefore, in this embodiment of the present invention, the charging and discharging device may be used both as a wireless charging receiving device to receive electric energy provided by a wireless charging cradle device, and as a wireless charging cradle device to provide charging current to a wireless charging receiving device, namely, support a reverse wireless charging function. Therefore, the method in this embodiment of the present invention can resolve the prior-art problem, that is, when a user goes out with two devices that support a wireless charging function, if one device runs out of power, the other device may be used to charge the device that runs out of power, thereby improving user experience.

Optionally, in an implementation, the determining that an electronic device wirelessly connected with the wireless charging and discharging device includes: when it is detected that a simulation ping value of the wireless charging and discharging device changes, determining that the electronic device wirelessly connected with the wireless charging and discharging device; or when it is detected that a level of a mechanical contact on the wireless charging and discharging device changes, determining that the electronic device wirelessly connected with the wireless charging and discharging device; or when it is detected that a level of a Hall component in the wireless charging and discharging device changes, determining that the electronic device wirelessly connected with the wireless charging and discharging device; or when a short-distance communication module of the wireless charging and discharging device detects that a device connected with the wireless charging and discharging device, determining that the electronic device wirelessly connected with the wireless charging and discharging device. For example, in this embodiment of the present invention, a wireless charging/discharging controller may periodically detect an inductance value of a wireless charging antenna. When no wireless charging receiving device connected with a mobile phone, the inductance value of the wireless charging antenna is a no-load inductance value. When a device connected with the mobile phone, the inductance value changes. When detecting that the inductance value changes, the wireless charging/discharging controller considers that an electronic device connected with the wireless charging and discharging device. It should be understood that a period in which the wireless charging/discharging controller periodically detects the inductance value of the wireless charging antenna may be preset, and a user may enter an instruction to change a value of the period. This is not limited in this embodiment of the present invention. For another example, in this embodiment of the present invention, a mechanical contact may be provided on the wireless charging and discharging device. When an electronic device connected with the wireless charging and discharging device, a level of the mechanical contact changes, so that when a level of the mechanical contact changes, the wireless charging/discharging controller may determine that an electronic device connected with the wireless charging and discharging device. For another example, in this embodiment of the present invention, a Hall component may be built in the wireless charging and discharging device, and a magnet is placed in an electronic device. When an electronic device connected with the wireless charging and discharging device, the Hall component may change an output level due to a magnet on the electronic device, so that when the level is changed, the wireless charging/discharging controller may determine that the electronic device connected with the wireless charging and discharging device. For another example, in this embodiment of the present invention, both the wireless charging and discharging device and the electronic device have a built-in short-distance communication module, and the short-distance communication module in the wireless charging and discharging device may perform scanning to determine whether there is a device that performs short-distance communication. When the short-distance communication module identifies a short-distance device, the wireless charging/discharging controller may determine that an electronic device connected with the wireless charging and discharging device. It should be understood that the short-distance communication module may be a Bluetooth module, an infrared module, a near field communication (Near Field Communication, NFC) module, or the like. This embodiment of the present invention is not limited thereto.

Optionally, in an implementation, after the determining that an electronic device wirelessly connected with the wireless charging and discharging device, the method further includes: determining a type of the electronic device.

Specifically, in an implementation, the determining a type of the electronic device includes: determining the type of the electronic device based on a received device information sent by the electronic device in a short-distance communication manner; or sending, by the first electronic device, in the wireless charging receiving mode of the first electronic device, device information of the first electronic device to the second electronic device, and determining that the second electronic device is a wireless charging cradle device when receiving a feedback information from the second electronic device; or determining that the second electronic device is a wireless charging receiving, in the wireless charging cradle mode of the first electronic device, a device information of the second electronic device when receiving a device information of the second electronic device from the second electronic device.

Optionally, in an implementation, after the device information of the wireless charging and discharging device is sent to the electronic device in the wireless charging receiving mode of the wireless charging and discharging device, if the feedback information of the electronic device is not received, the determining a type of the electronic device further includes: switching the wireless charging and wireless discharging device to the wireless charging cradle mode, and determining that the electronic device is a wireless charging receiving device when receiving the device information from the electronic device using a second antenna; or in the wireless charging cradle mode of the wireless charging and discharging device, if the feedback information of the electronic device is not received, the determining a type of the electronic device further includes: switching the wireless charging and wireless discharging device to the wireless charging receiving mode, sending the device information of the wireless charging and wireless discharging device to the electronic device using a first antenna, and determining that the electronic device is a wireless charging cradle device when receiving the feedback information from the electronic device. Specifically, after the wireless charging and discharging device determines that the electronic device connected with the wireless charging and discharging device, the wireless charging and discharging device controller may first set the wireless charging and discharging device to the wireless charging receiving mode. The wireless charging/discharging controller generates different levels on the first antenna using different loads to send information about the wireless charging and discharging device to the electronic device, and waits for the feedback information of the electronic device. If the feedback information is received within a period of time, it is determined that the electronic device is a wireless charging cradle device. If the feedback information is not received, it is considered that the electronic device is not a wireless charging cradle device. Then, the wireless charging/discharging controller sets the wireless charging and discharging device to the wireless charging cradle mode, and waits for, using the second antenna, the device information fed back by the electronic device. If the device information fed back by the electronic device is received, it is determined that the electronic device is a wireless charging receiving device. If the device information fed back by the electronic device is not received, it is considered that the device access is invalid. Optionally, after the device access of the electronic device is considered invalid, the wireless charging and discharging device may further repeat the foregoing action until a device is successfully identified or the electronic device is in a disconnected state.

Alternatively, in an implementation, in the wireless charging receiving mode of the wireless charging and discharging device, when failed to receive the feedback information from the electronic device, in the wireless charging receiving mode of the wireless charging and wireless discharging device, the method further comprises: controlling the wireless charging and wireless discharging device to display first prompt information using a display screen, wherein the first prompt information is used to prompt a user whether to switch the wireless charging and discharging device from the wireless charging receiving mode to the wireless charging cradle mode; or when failed to receive the feedback information from the electronic device, in the wireless charging cradle mode of the wireless charging and wireless discharging device, the method further comprises: controlling the wireless charging and wireless discharging device to display second prompt information using a display screen, wherein the second prompt information is used to prompt a user whether to switch the wireless charging and wireless discharging device from the wireless charging cradle mode to the wireless charging receiving mode. Therefore, in this embodiment of the present invention, if the type of the electronic device is not identified in a current mode of the charging and discharging device, prompt information may be displayed on the display screen to prompt the user whether to switch the mode, so as to identify the electronic device and exchange energy with the electronic device.

Optionally, in an implementation, in a process of charging the wireless charging and wireless discharging device using the wireless charging cradle device, the method further comprises: sending status information of the wireless charging and wireless discharging device to the wireless charging cradle device according to a preset wireless charging communication protocol, so that the wireless charging cradle device adjusts, based on the status information of the wireless charging and wireless discharging device, output power for charging the charging and discharging device, wherein the status information of the wireless charging and wireless discharging device comprises at least one of: a quantity of electricity, a charging current, a battery voltage, or temperature information of the wireless charging and wireless discharging device; or in a process of providing charging current to the wireless charging receiving device, the method further includes: receiving, according to a preset wireless charging communication protocol, status information of the wireless charging receiving device sent by the wireless charging receiving device, wherein the status information of the wireless charging receiving device comprises at least one of: a quantity of electricity, a charging current, a battery voltage, or temperature information of the wireless charging receiving device; and adjusting, based on the status information of the electronic device, output power for providing charging current to the wireless charging receiving device.

Optionally, in an implementation, the charging the wireless charging and discharging device using the wireless charging cradle device includes: receiving, using the first antenna, charging electric energy provided by the wireless charging cradle device, to charge the wireless charging and discharging device; and the providing charging current to the wireless charging receiving device includes: providing charging current to the wireless charging receiving device using the second antenna.

Optionally, in an implementation, the first antenna and the second antenna are a same antenna.

In this embodiment of the present invention, the charging and discharging device may be used both as a wireless charging receiving device to receive electric energy provided by a wireless charging cradle device, and as a wireless charging cradle device to provide charging current to a wireless charging receiving device, namely, support a reverse wireless charging function. User experience is improved.

According to a second aspect, a wireless charging and discharging device is provided, and the charging and discharging device is configured to perform the method according to any one of the first aspect or the possible implementations of the first aspect. Specifically, the wireless charging and discharging device includes a unit configured to perform the method.

According to a third aspect, a charging and discharging device is provided, and the charging and discharging device includes a charging and wireless discharging controller, a battery, a first antenna, and a second antenna, where the wireless charging and wireless discharging controller is configured to determine that an electronic device wirelessly connected with the wireless charging and discharging device; the wireless charging and wireless discharging controller is further configured to: charge the wireless charging and wireless discharging device using the wireless charging cradle device, in a wireless charging receiving mode of the wireless charging and wireless discharging device, when the electronic device is a wireless charging cradle device; and the wireless charging and wireless discharging controller is further configured to: when the electronic device is a wireless charging receiving device, in a wireless charging cradle mode of the wireless charging and discharging device, provide charging current to the wireless charging receiving device, in a wireless charging cradle mode of the wireless charging and wireless discharging device, when the electronic device is a wireless charging receiving device. In this embodiment of the present invention, the charging and discharging device may be used both as a wireless charging receiving device to receive electric energy provided by a wireless charging cradle device, and as a wireless charging cradle device to provide charging current to a wireless charging receiving device, namely, support a reverse wireless charging function. Therefore, the method in this embodiment of the present invention can resolve the prior-art problem and improve user experience.

Optionally, in an implementation, after determining that the electronic device connected with the wireless charging and discharging device, the wireless charging and wireless discharging controller is further configured to: determine a type of the electronic device.

Optionally, in an implementation, in terms of determining the type of the electronic device, the wireless charging and wireless discharging controller is specifically configured to: determine the type of the electronic device based on received device information sent by the electronic device in a short-distance communication manner; or in the wireless charging receiving mode of the wireless charging and discharging device, send device information of the wireless charging and discharging device to the electronic device using the first antenna, and if feedback information of the electronic device is received, determine that the electronic device is a wireless charging cradle device; or in the wireless charging cradle mode of the wireless charging and discharging device, if device information fed back by the electronic device is received using the second antenna, determine that the electronic device is a wireless charging receiving device.

Optionally, in an implementation, after the device information of the wireless charging and discharging device is sent to the electronic device in the wireless charging receiving mode of the wireless charging and discharging device, if the feedback information of the electronic device is not received, in terms of determining the type of the electronic device, the wireless charging/discharging controller is further configured to: switch the wireless charging and discharging device to the wireless charging cradle mode, and if the device information fed back by the electronic device is received using the second antenna, determine that the electronic device is a wireless charging receiving device; or in the wireless charging cradle mode of the wireless charging and discharging device, if the feedback information of the electronic device is not received, in terms of determining the type of the electronic device, the wireless charging/discharging controller is further configured to: switch the wireless charging and discharging device to the wireless charging receiving mode, send the device information of the wireless charging and discharging device to the electronic device using the first antenna, and if the feedback information of the electronic device is received, determine that the electronic device is a wireless charging cradle device.

Optionally, in an implementation, the wireless charging and discharging device further includes a display screen; and after the device information of the wireless charging and discharging device is sent to the electronic device in the wireless charging receiving mode of the wireless charging and discharging device, if the feedback information of the electronic device is not received, the wireless charging/discharging controller is further configured to: control the wireless charging and discharging device to display first prompt information using the display screen, where the first prompt information is used to prompt a user whether to switch the wireless charging and wireless discharging device from the wireless charging receiving mode to the wireless charging cradle mode; or in the wireless charging cradle mode of the wireless charging and discharging device, if the feedback information of the electronic device is not received, the wireless charging/discharging controller is further configured to: control the wireless charging and discharging device to display second prompt information using the display screen, where the second prompt information is used to prompt a user whether to switch the electronic device from the wireless charging cradle mode to the wireless charging receiving mode.

Optionally, in an implementation, in terms of determining that the electronic device wirelessly connected with the wireless charging and discharging device, the wireless charging/discharging controller is specifically configured to: when it is detected that a simulation Packet Internet Groper ping value of the wireless charging and discharging device changes, determine that the electronic device wirelessly connected with the wireless charging and discharging device; or when it is detected that a level of a mechanical contact on the wireless charging and discharging device changes, determine that the electronic device wirelessly connected with the wireless charging and discharging device; or when it is detected that a level of a Hall component in the wireless charging and discharging device changes, determine that the electronic device wirelessly connected with the wireless charging and discharging device; or when a short-distance communication module of the wireless charging and discharging device detects that a device connected with the wireless charging and discharging device, determine that the electronic device wirelessly connected with the wireless charging and discharging device.

Optionally, in an implementation, in a process of receiving, using the first antenna, charging electric energy provided by the wireless charging cradle device, to charge the battery of the wireless charging and discharging device, the wireless charging/discharging controller is further configured to: send status information of the wireless charging and discharging device to the wireless charging cradle device according to a preset wireless charging communication protocol, so that the wireless charging cradle device adjusts, based on the status information of the wireless charging and discharging device, output power for charging the charging and discharging device, where the status information of the wireless charging and discharging device includes at least one of the following: a quantity of electricity, a charging current, a battery voltage, and temperature information of the wireless charging and discharging device; or in a process of providing charging current to the electronic device using the second antenna, the wireless charging/discharging controller is further configured to: receive, according to a preset wireless charging communication protocol, status information of the wireless charging receiving device sent by the wireless charging receiving device, where the status information of the wireless charging receiving device includes at least one of the following: a quantity of electricity, a charging current, a battery voltage, and temperature information of the wireless charging receiving device; and adjust, based on the status information of the wireless charging receiving device, output power for providing charging current to the wireless charging receiving device.

Optionally, in an implementation, the first antenna and the second antenna are a same antenna.

According to a fourth aspect, a wireless charging and discharging device is provided, and the wireless charging and discharging device includes a processor and a memory. The memory is configured to store a computer program, and the processor is configured to execute the computer program stored in the memory, and perform the method according to any one of the first aspect or the possible implementations of the first aspect.

According to a fifth aspect, a computer storage medium is provided and is configured to store a computer software instruction used by the foregoing wireless charging and discharging device, and the computer software instruction includes an instruction used to perform the method according to any one of the first aspect or the possible implementations of the first aspect.

Therefore, in the embodiments of the present invention, the charging and discharging device may be used both as a wireless charging receiving device to receive electric energy provided by a wireless charging cradle device, and as a wireless charging cradle device to provide charging current to a wireless charging receiving device, namely, support a reverse wireless charging function. Therefore, the method in the embodiments of the present invention can resolve the prior-art problem, that is, when a user carries two devices that support a wireless charging function, even if one device runs out of power, the other device may be used to charge the device that runs out of power, thereby improving user experience.

DESCRIPTION OF EMBODIMENTS

The following clearly describes the technical solutions in the embodiments of the present invention with reference to the accompanying drawings in the embodiments of the present invention.

In view of a problem that, currently a receive end device that supports wireless charging in the industry can only receive electric energy, but cannot output wireless electric energy, and this affects user experience, the embodiments of the present invention artfully provide a wireless charging and discharging device. The wireless charging and discharging device may be used both as a wireless charging receiving device to receive electric energy provided by a wireless charging cradle device, and as a wireless charging cradle device to charge an external wireless charging receiving device, namely, support a reverse wireless discharging function. Therefore, the method in the embodiments of the present invention can resolve the prior-art problem, that is, when a user goes out with two devices that support a wireless charging function, even if one device runs out of power, the other device may be used to charge the device that runs out of power, thereby improving user experience.

For ease of understanding and description, by way of example, and not limitation, the following describes charging or discharging execution processes and actions of the charging/discharging method and the charging and discharging device in this application.

It should be understood that the charging and discharging device in the embodiments of the present invention can wirelessly obtain electric energy from an electronic device (a wireless charging cradle device), so as to implement wireless charging. The charging and discharging device in the embodiments of the present invention can also wirelessly charge another electronic device (a wireless charging receiving device).

Specifically, in the embodiments of the present invention, the wireless charging and discharging device may include a computer, a smartphone, a game console, a wearable device, a portable Android device (Portable Android Device, "PAD" for short), a portable device, a wireless mobile power supply (Mobile Power Pack, MPP) (which may also be referred to as a mobile power pack or a travel charger) that has a wireless charging/discharging function, or the like, provided that the wireless charging and discharging device can be charged wirelessly and can wirelessly charge another electronic device. The embodiments of the present invention are not limited thereto.

Figure 1:
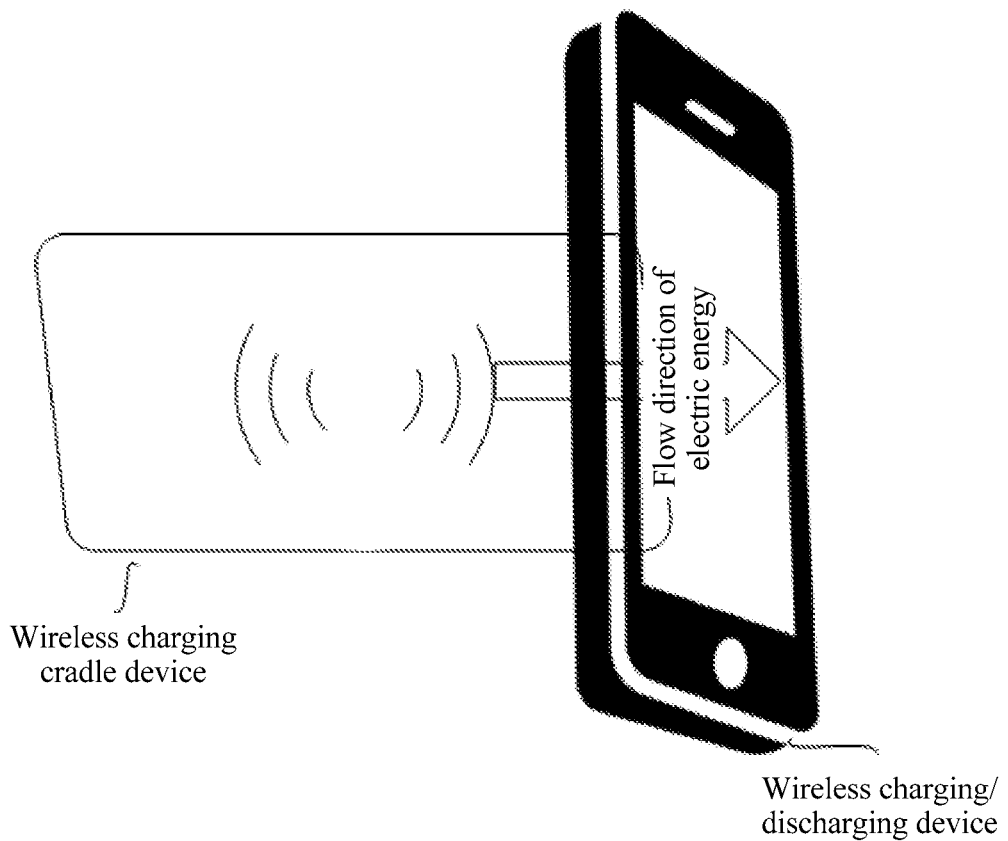
FIG. 1 is a schematic diagram of an applicable scenario according to an embodiment of the present invention.

For example, as shown in FIG. 1, the wireless charging and discharging device may wirelessly obtain electric energy from the electronic device to implement wireless charging.

In a scenario of FIG. 1, an electronic device is a wireless charging cradle device. The wireless charging cradle device may wirelessly charge the wireless charging and discharging device. For example, the wireless charging cradle device may be a computer, a smartphone, a game console, a wearable device, a portable Android device (Portable Android Device, "PAD" for short), or a wireless mobile power supply (Mobile Power Pack, MPP) (which may also be referred to as a mobile power pack or a travel charger). The wireless charging cradle device may also be another charging and discharging device.

Figure 2:
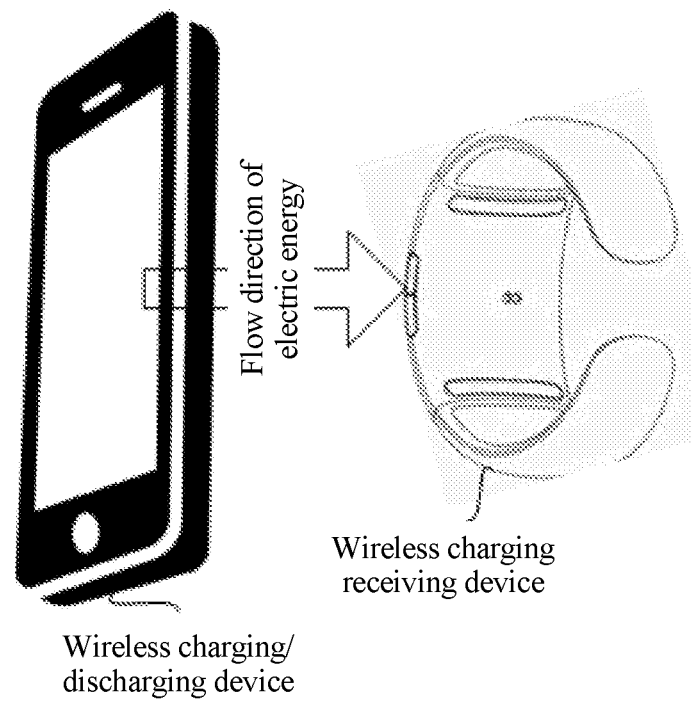
FIG. 2 is a schematic diagram of another applicable scenario according to an embodiment of the present invention.

For another example, as shown in FIG. 2, the wireless charging and discharging device may wirelessly charge the electronic device.

In a scenario of FIG. 2, an electronic device is a wireless charging receiving device. The wireless charging receiving device may wirelessly obtain electric energy from the wireless charging and discharging device, to implement wireless charging. For example, the wireless charging receiving device may be a computer, a smartphone, a game console, a wearable device, a portable Android device (Portable Android Device, "PAD" for short), or a wireless mobile power supply (Mobile Power Pack, MPP) (which may also be referred to as a mobile power pack or a travel charger) that has a wireless charging function. The wireless charging receiving device may also be another charging and discharging device.

It should be understood that, the embodiments of the present invention are not limited thereto provided that the electronic device can be charged wirelessly or wirelessly charge another device.

It should be understood that, in the embodiments of the present invention, the wireless charging and discharging device and the electronic device may perform charging/discharging using internationally universal standards such as the Wireless Power Consortium (Wireless Power Consortium, WPC) standard (which may also be referred to as the Qi standard), A4WP, and PMA (Power Matters Alliance) standard. However, the embodiments of the present invention are not limited thereto.

Figure 3:
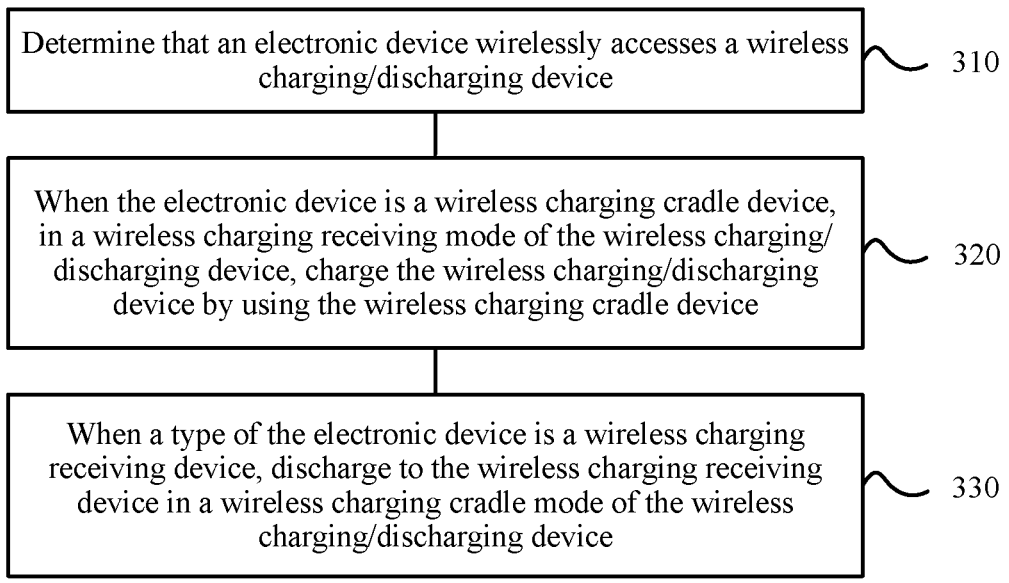
FIG. 3 is a schematic flowchart of a charging/discharging method according to an embodiment of the present invention.

FIG. 3 is a schematic flowchart of a wireless charging/discharging method according to an embodiment of the present invention. The method 300 shown in FIG. 3 is applied to a charging and discharging device. The wireless charging and discharging device may include a wireless charging/discharging controller, a battery, a first antenna, and a second antenna. The wireless charging/discharging controller may receive, using the first antenna, charging electric energy provided for the battery of the wireless charging and discharging device by a wireless charging cradle device. The wireless charging/discharging controller may discharge, using the second antenna, to an electronic device that connected with the charging and discharging device. Optionally, the wireless charging/discharging controller may control charging/discharging of the battery by controlling a power supply management unit. It should be understood that the power supply management unit may be an independent management unit, or may be a same unit as the wireless charging/discharging controller. The wireless charging/discharging controller may be an independent control unit, or may be a same unit as a processor of the wireless charging and discharging device. The first antenna and the second antenna may be two independent antennas, or may be a same antenna. This embodiment of the present invention is not limited thereto. Specifically, the method 300 shown in FIG. 3 may be performed by the wireless charging/discharging controller in the wireless charging and discharging device, and the method 300 includes the following steps.

310. Determine that an electronic device wirelessly connected with the wireless charging and discharging device.

Specifically, the wireless charging/discharging controller may determine, in one of the following manners, that the electronic device connected with the wireless charging and discharging device.

Manner 1: When it is detected that a simulation ping value of the wireless charging and discharging device changes, it is determined that the electronic device connected with the wireless charging and discharging device.

For example, in this embodiment of the present invention, the wireless charging/discharging controller may periodically detect an inductance value of a wireless charging antenna. When no wireless charging receiving device connected with a mobile phone, the inductance value of the wireless charging antenna is a no-load inductance value. When a device connected with the mobile phone, the inductance value changes. When detecting that the inductance value changes, the wireless charging/discharging controller considers that an electronic device connected with the wireless charging and discharging device.

It should be understood that a period in which the wireless charging/discharging controller periodically detects the inductance value of the wireless charging antenna may be preset, and a user may enter an instruction to change a value of the period. This is not limited in this embodiment of the present invention.

Manner 2: When it is detected that a level of a mechanical contact on the wireless charging and discharging device changes, it is determined that the electronic device connected with the wireless charging and discharging device.

For example, in this embodiment of the present invention, a mechanical contact may be provided on the wireless charging and discharging device. When an electronic device connected with the wireless charging and discharging device, a level of the mechanical contact changes, so that when the level of the mechanical contact changes, the wireless charging/discharging controller may determine that an electronic device connected with the wireless charging and discharging device.

Manner 3: When it is detected that a level of a Hall component in the wireless charging and discharging device changes, it is determined that the electronic device connected with the wireless charging and discharging device.

For example, in this embodiment of the present invention, a Hall component may be built in the wireless charging and discharging device, and a magnet is placed in an electronic device. When an electronic device connected with the wireless charging and discharging device, the Hall component may change an output level due to a magnet on the electronic device, so that when the level is changed, the wireless charging/discharging controller may determine that the electronic device connected with the wireless charging and discharging device.

Manner 4: When a short-distance communication module of the wireless charging and discharging device detects that a device connected with the wireless charging and discharging device, it is determined that the electronic device connected with the wireless charging and discharging device.

For example, in this embodiment of the present invention, both the wireless charging and discharging device and the electronic device have a built-in short-distance communication module, and the short-distance communication module in the wireless charging and discharging device may perform scanning to determine whether there is a device that performs short-distance communication. When the short-distance communication module identifies a short-distance device, the wireless charging/discharging controller may determine that an electronic device connected with the wireless charging and discharging device.

It should be understood that the short-distance communication module may be a Bluetooth module, an infrared module, a near field communication (Near Field Communication, NFC) module, or the like. This embodiment of the present invention is not limited thereto.

Optionally, after it is determined that the electronic device connected with the wireless charging and discharging device, the method may further include:

determining a type of the electronic device.

Specifically, the wireless charging/discharging controller may determine the type of the electronic device in a plurality of manners. For example, the wireless charging/discharging controller may determine the type of the electronic device in one of the following manners.

Manner 1: The wireless charging/discharging controller determines the type of the electronic device based on received device information sent by the electronic device in a short-distance communication manner.

Specifically, after the wireless charging and discharging device determines that the electronic device connected with the wireless charging and discharging device, a wireless communications module of the wireless charging and discharging device establishes a connection to a wireless communications module of the electronic device. The electronic device may send device information to the wireless charging and discharging device, where the device information is used to indicate the type of the electronic device, and the wireless charging and discharging device may determine the type of the electronic device based on the device information.

Manner 2: In a wireless charging receiving mode of the wireless charging and discharging device, the wireless charging/discharging controller sends device information of the wireless charging and discharging device to the electronic device using the first antenna, and if feedback information of the electronic device is received, determines that the electronic device is a wireless charging cradle device; or in a wireless charging cradle mode of the wireless charging and discharging device, if device information fed back by the electronic device is received using the second antenna, the wireless charging/discharging controller determines that the electronic device is a wireless charging receiving device.

Further, in Manner 2, after the device information of the wireless charging and discharging device is sent to the electronic device in the wireless charging receiving mode of the wireless charging and discharging device, if the feedback information of the electronic device is not received, the wireless charging/discharging controller may further switch the wireless charging and discharging device to the wireless charging cradle mode, and if the device information fed back by the electronic device is received using the second antenna, determine that the electronic device is a wireless charging receiving device.

In Manner 2, in the wireless charging cradle mode of the wireless charging and discharging device, if the feedback information of the electronic device is not received, the wireless charging/discharging controller may further switch the wireless charging and discharging device to the wireless charging receiving mode, send the device information of the wireless charging and discharging device to the electronic device using the first antenna, and if the feedback information of the electronic device is received, determine that the electronic device is a wireless charging cradle device.

Specifically, after the wireless charging and discharging device determines that the electronic device connected with the wireless charging and discharging device, the wireless charging and discharging device controller may first set the wireless charging and discharging device to the wireless charging receiving mode. The wireless charging/discharging controller generates different levels on the first antenna using different loads, to send information about the wireless charging and discharging device to the electronic device, and waits for the feedback information of the electronic device. If the feedback information is received within a period of time, it is determined that the electronic device is a wireless charging cradle device. If the feedback information is not received, it is considered that the electronic device is not a wireless charging cradle device. Then, the wireless charging/discharging controller sets the wireless charging and discharging device to the wireless charging cradle mode, and waits for, using the second antenna, the device information fed back by the electronic device. If the device information fed back by the electronic device is received, it is determined that the electronic device is a wireless charging receiving device. If the device information fed back by the electronic device is not received, it is considered that the device access is invalid. Optionally, after the device access of the electronic device is considered invalid, the wireless charging and discharging device may further repeat the foregoing action until a device is successfully identified or the electronic device is in a disconnected state.

In the foregoing description, in the wireless charging receiving mode or the wireless charging cradle mode, before the type of the electronic device is identified, the wireless charging/discharging controller automatically performs mode switching, and continues to identify the type of the electronic device.

Alternatively, in this embodiment of the present invention, the wireless charging/discharging controller cannot automatically perform mode switching, and the user needs to manually switch a mode of the wireless charging and discharging device using a menu.

In a scenario in which the user needs to manually switch a wireless charging/discharging mode, after the wireless charging/discharging controller sends the device information of the wireless charging and discharging device to the electronic device in the wireless charging receiving mode of the wireless charging and discharging device, if the feedback information of the electronic device is not received, the method further includes: controlling the wireless charging and discharging device to display first prompt information using a display screen, where the first prompt information is used to prompt the user whether to switch the electronic device from the wireless charging receiving mode to the wireless charging cradle mode; or in the wireless charging cradle mode of the wireless charging and discharging device, if the feedback information of the electronic device is not received, the method further includes: controlling the wireless charging and discharging device to display second prompt information using a display screen, where the second prompt information is used to prompt the user whether to switch the electronic device from the wireless charging cradle mode to the wireless charging receiving mode.

Therefore, in this embodiment of the present invention, if the type of the electronic device is not identified in a current mode of the charging and discharging device, prompt information may be displayed on the display screen to prompt the user whether to switch the mode, so as to identify the electronic device and exchange energy with the electronic device.

After the type of the electronic device is determined, the charging and discharging device may charge the electronic device, or receive electric energy provided by the electronic device. For details, refer to the description in the following step 320.

320. When the electronic device is a wireless charging cradle device, in a wireless charging receiving mode of the wireless charging and discharging device, charge the wireless charging and discharging device using the wireless charging cradle device.

Specifically, the wireless charging/discharging controller may receive, using the first antenna, charging electric energy provided by the wireless charging cradle device, to charge the battery of the wireless charging and discharging device.

Optionally, in a process of charging the wireless charging and discharging device using the wireless charging cradle device, the method further includes:

sending status information of the wireless charging and discharging device to the wireless charging cradle device according to a preset wireless charging communication protocol, so that the wireless charging cradle device adjusts, based on the status information of the wireless charging and discharging device, output power for charging the charging and discharging device, where the status information of the wireless charging and discharging device includes at least one of the following: a quantity of electricity, a charging current, a battery voltage, and temperature information of the wireless charging and discharging device.

330. When an electronic device is a wireless charging receiving device, provide charging current to the wireless charging receiving device in a wireless charging cradle mode of the wireless charging and discharging device.

Specifically, the wireless charging/discharging controller may provide charging current to the electronic device using the second antenna.

Optionally, in a process of providing charging current to the wireless charging receiving device, the method further includes:

receiving, according to a preset wireless charging communication protocol, status information of the wireless charging receiving device sent by the wireless charging receiving device, where the status information of the wireless charging receiving device includes at least one of the following: a quantity of electricity, a charging current, a battery voltage, and temperature information of the wireless charging receiving device; and adjusting, based on the status information of the electronic device, output power to provide charging current to the wireless charging receiving device.

In this embodiment of the present invention, the charging and discharging device may be used both as a wireless charging receiving device to receive electric energy provided by a wireless charging cradle device, and as a wireless charging cradle device to provide charging current to a wireless charging receiving device, namely, support a reverse wireless charging function. Therefore, the method in this embodiment of the present invention can resolve the prior-art problem, that is, when a user goes out with two devices that support a wireless charging function, if one device runs out of power, the other device may be used to charge the device that runs out of power, thereby improving user experience.

Figure 4:
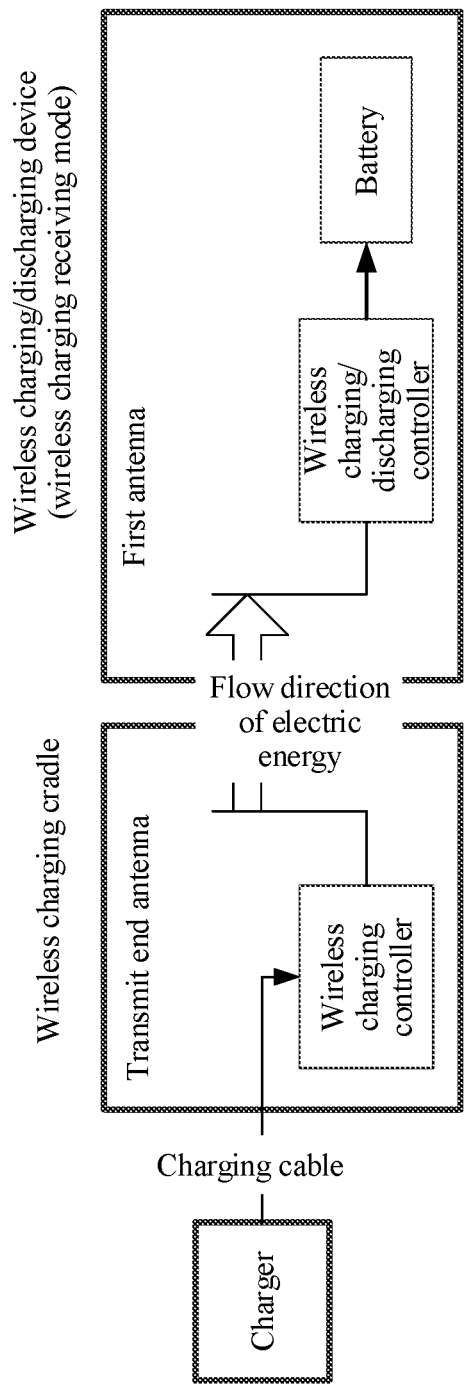
FIG. 4 is a schematic diagram of charging according to an embodiment of the present invention.

For example, as shown in FIG. 4, the electronic device is a wireless charging cradle device. In the wireless charging receiving mode, the wireless charging and discharging device receives, using the first antenna, the charging electric energy provided by the wireless charging cradle device, to charge the battery of the wireless charging and discharging device. In this scenario, the battery of the wireless charging and discharging device is in a charging state.

Figure 5:
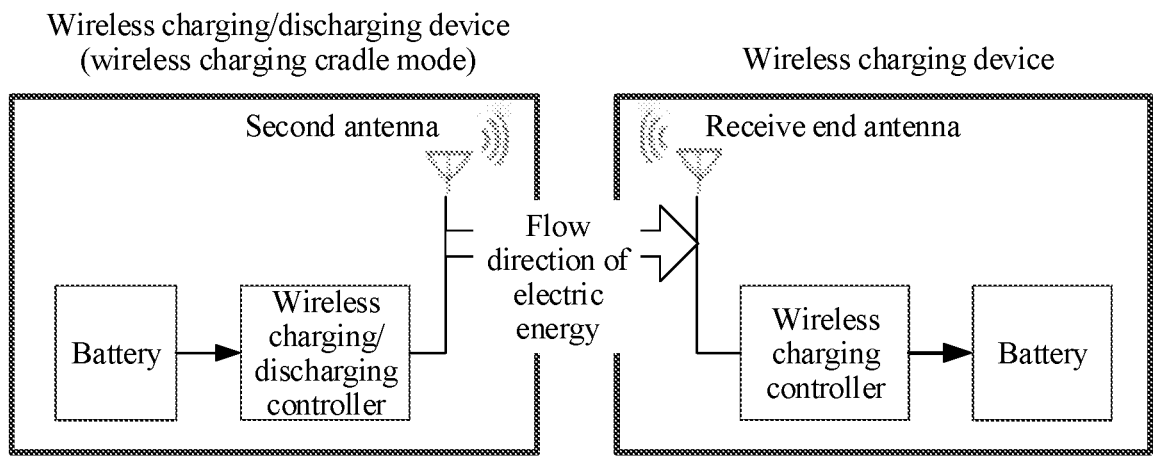
FIG. 5 is a schematic diagram of discharging according to an embodiment of the present invention.

As shown in FIG. 5, the electronic device is a wireless charging receiving device, the wireless charging and discharging device is in the wireless charging cradle mode, and provides charging current to the wireless charging receiving device using the second antenna. In this scenario, the battery of the wireless charging and discharging device is in a discharging state.

With reference to the scenarios shown in FIG. 4 and FIG. 5, from perspectives of automatic and manual manners, the following separately describes specific charging/discharging processes of the wireless charging and discharging device in this embodiment of the present invention.

In the automatic manner, the charging and discharging device in this embodiment of the present invention can automatically switch to the wireless charging receiving mode or the wireless charging cradle mode depending on a type of an electronic device. For example, when being placed on a wireless charging cradle device, the wireless charging and discharging device receives electric energy output from the wireless charging cradle device in the wireless charging receiving mode. If an electronic device (namely, a wireless charging receiving device) that supports wireless charging connected with the charging and discharging device, the wireless charging and discharging device automatically switches to the wireless charging cradle mode to charge the electronic device.

In the manual manner, the charging and discharging device in this embodiment of the present invention is by default in the wireless charging receiving mode. If the wireless charging cradle mode needs to be used, a user needs to manually set the charging and discharging device to the wireless charging cradle mode using a settings menu of the charging and discharging device. When the charging and discharging device is in the wireless charging cradle mode, the charging and discharging device can only radiate energy but cannot receive energy radiated from another wireless charging cradle device. When the charging and discharging device needs to exit the wireless charging cradle mode, the user needs to manually set the charging and discharging device to the wireless charging receiving mode using the settings menu. When the charging and discharging device is in the wireless charging receiving mode, the charging and discharging device can only receive energy, and cannot radiate energy. When the charging and discharging device needs to exit the wireless charging receiving mode, the user needs to manually set the charging and discharging device to the wireless charging cradle mode using the settings menu.

The following first describes specific charging/discharging processes of the wireless charging and discharging device in the automatic manner.

Specifically, the wireless charging and discharging device (for example, a mobile phone) is initially in a wireless charging receiving device scanning mode, and periodically sends a wireless charging receiving device scanning signal to perform scanning to determine whether there is an electronic device that supports wireless charging connecting with the wireless charging and discharging device.

Specifically, for the access identification process, refer to the description in the foregoing step 310, and details are not described herein again.

When the wireless charging and discharging device is placed on a wireless charging cradle device, the wireless charging and discharging device identifies access of the wireless charging cradle device, and communicates with the wireless charging cradle device. In this case, the charging and discharging device switches to the wireless charging receiving mode, and obtains electric energy from the wireless charging cradle device. In a charging process, the charging and discharging device and the wireless charging cradle device follow the wireless charging communication protocol. The charging and discharging device periodically reports information such as a quantity of electricity, a charging current, a battery voltage, and a temperature of the charging and discharging device to the wireless charging cradle device, so that the wireless charging cradle device adjusts output power and controls the charging procedure. After the charging and discharging device is fully charged, the wireless charging and discharging device sends full charging information to the wireless charging cradle device, and the wireless charging cradle device stops charging the wireless charging and discharging device after receiving related information, but still maintains a periodic communication state. After the wireless charging and discharging device is removed from the wireless charging cradle device, the wireless charging and discharging device fails to communicate with the wireless charging cradle device. The wireless charging and discharging device ends the wireless charging receiving mode, and re-enters the wireless charging receiving device scanning mode.

When the electronic device that supports wireless charging, namely, the wireless charging receiving device (for example, a wristband) is placed on the wireless charging and discharging device (for example, a mobile phone), the wireless charging and discharging device identifies access of the wireless charging receiving device, and communicates with the wireless charging receiving device and identifies that an accessed device is a wristband device. In this case, the wireless charging and discharging device switches to the wireless charging cradle mode, to charge the wireless charging receiving device. In a charging process, the charging and discharging device and the wireless charging receiving device follow the wireless charging communication protocol. The wireless charging receiving device periodically reports information such as a quantity of electricity, a charging current, a battery voltage, and a temperature of the wireless charging receiving device to the wireless charging and discharging device, so that the wireless charging and discharging device adjusts output power and controls the charging procedure. After the wireless charging receiving device is fully charged, the wireless charging receiving device sends full charging information to the wireless charging and discharging device, and the wireless charging and discharging device stops charging the wireless charging receiving device after receiving related information, but still maintains a periodic communication state. After the wireless charging receiving device is removed from the wireless charging and discharging device, the wireless charging and discharging device fails to communicate with the wireless charging receiving device. The wireless charging and discharging device ends the wireless charging cradle mode, and re-enters the wireless charging receiving device scanning mode.

The following describes specific charging/discharging processes of the wireless charging and discharging device in the manual manner.

Specifically, the charging and discharging device supporting reverse wireless charging is initially in the wireless charging receiving mode. In this case, when the wireless charging and discharging device is placed on a wireless charging cradle device, the wireless charging and discharging device establishes communication with the wireless charging cradle device and reports device related information. The wireless charging cradle device controls output power based on the information reported by the wireless charging and discharging device, and the wireless charging and discharging device obtains electric energy from the wireless charging cradle device. In a charging process, the charging and discharging device and the wireless charging cradle device follow the wireless charging communication protocol. The wireless charging and discharging device periodically reports information such as a battery level, a charging current, a battery voltage, and a temperature of the wireless charging and discharging device to the wireless charging cradle device, so that the wireless charging cradle device adjusts output power and controls the charging procedure. After the wireless charging and discharging device is fully charged, the wireless charging and discharging device sends full charging information to the wireless charging cradle device, and the wireless charging cradle device stops charging the wireless charging and discharging device after receiving related information, but still maintains a periodic communication state. After the wireless charging and discharging device is removed from the wireless charging cradle device, the wireless charging and discharging device fails to communicate with the wireless charging cradle device, and ends communication with the current charging cradle, but is still in the wireless charging receiving mode and waits to connect with a wireless charging cradle device to receive electric energy.

When the wireless charging and discharging device is in the wireless charging receiving mode, if a wireless charging receiving device (for example, a wristband) is placed on the wireless charging and discharging device, the wireless charging receiving device cannot be identified, and the wireless charging and discharging device cannot charge the wireless charging receiving device.

If the wireless charging receiving device needs to be charged, the user needs to be instructed to set the wireless charging and discharging device to the wireless charging cradle mode using a menu of the wireless charging and discharging device. In this case, when the wireless charging receiving device is placed on the wireless charging and discharging device, connect with of the wireless charging receiving device is identified. The wireless charging and discharging device establishes communication with the wireless charging receiving device and obtains related device information of the wireless charging receiving device. The wireless charging and discharging device controls wireless charging output power based on the obtained information, to charge the wireless charging receiving device. In a charging process, the charging and discharging device and the wireless charging receiving device follow the wireless charging communication protocol. The wireless charging receiving device periodically reports information such as a quantity of electricity, a charging current, a battery voltage, and a temperature of the wireless charging receiving device to the wireless charging and discharging device, so that the wireless charging and discharging device adjusts output power and controls the charging procedure. After the wireless charging receiving device is fully charged, the wireless charging receiving device sends full charging information to the wireless charging and discharging device, and the wireless charging and discharging device stops charging the wireless charging receiving device after receiving related information, but still maintains a periodic communication state. After the wireless charging receiving device is removed from the wireless charging and discharging device, the wireless charging and discharging device fails to communicate with the wireless charging receiving device. The wireless charging and discharging device ends communication with the wireless charging receiving device, but is still in the wireless charging cradle mode and waits for charging a next device.

When the wireless charging and discharging device is set to the wireless charging cradle mode, the wireless charging and discharging device cannot receive charging electric energy from an external wireless charging cradle device. If the wireless charging and discharging device needs to be charged wirelessly, the user needs to be instructed to enable the wireless charging and discharging device to exit the wireless charging cradle mode using the menu of the wireless charging and discharging device, and set the wireless charging and discharging device to the wireless charging receiving mode.

Figure 6:
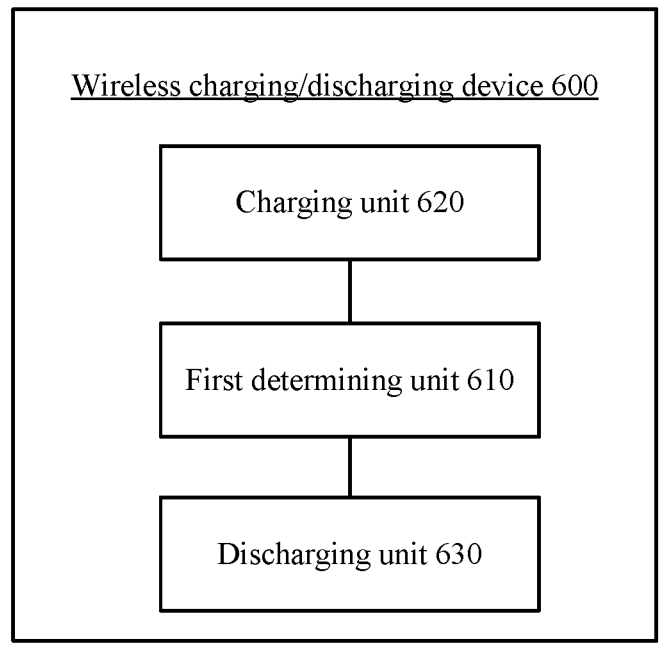
FIG. 6 is a schematic block diagram of a charging and discharging device according to an embodiment of the present invention.

FIG. 6 is a schematic block diagram of a wireless charging and discharging device according to an embodiment of the present invention. The wireless charging and discharging device 600 shown in FIG. 6 includes:

a first determining unit 610, configured to determine that an electronic device wirelessly connected with the wireless charging and discharging device;

a charging unit 620, configured to: when the electronic device is a wireless charging cradle device, in a wireless charging receiving mode of the wireless charging and discharging device, charge the wireless charging and discharging device using the wireless charging cradle device; and a discharging unit 630, configured to: when an electronic device is a wireless charging receiving device, provide charging current to the wireless charging receiving device in a wireless charging cradle mode of the wireless charging and discharging device.

In this embodiment of the present invention, the charging and discharging device may be used both as a wireless charging receiving device to receive electric energy provided by a wireless charging cradle device, and as a wireless charging cradle device to charge an external wireless charging receiving device, namely, support a reverse wireless charging function. Therefore, the method in this embodiment of the present invention can resolve the prior-art problem and improve user experience.

Optionally, in another embodiment, the wireless charging and discharging device further includes:

a second determining unit, configured to determine a type of the electronic device after the first determining unit determines that the electronic device wirelessly connected with the wireless charging and discharging device.

Optionally, in another embodiment, the second determining unit is specifically configured to determine the type of the electronic device based on received device information sent by the electronic device in a short-distance communication manner; or the second determining unit is specifically configured to: in the wireless charging receiving mode of the wireless charging and discharging device, send device information of the wireless charging and discharging device to the electronic device, and if feedback information of the electronic device is received, determine that the electronic device is a wireless charging cradle device; or the second determining unit is specifically configured to: in the wireless charging cradle mode of the wireless charging and discharging device, if device information fed back by the electronic device is received, determine that the electronic device is a wireless charging receiving device.

Optionally, in another embodiment, after the device information of the wireless charging and discharging device is sent to the electronic device in the wireless charging receiving mode of the wireless charging and discharging device, if the feedback information of the electronic device is not received, the second determining unit is further configured to: switch the wireless charging and discharging device to the wireless charging cradle mode, and if the device information fed back by the electronic device is received using the second antenna, determine that the electronic device is a wireless charging receiving device; or in the wireless charging cradle mode of the wireless charging and discharging device, if the feedback information of the electronic device is not received, the second determining unit is further configured to: switch the wireless charging and discharging device to the wireless charging receiving mode, send the device information of the wireless charging and discharging device to the electronic device using the first antenna, and if the feedback information of the electronic device is received, determine that the electronic device is a wireless charging cradle device.

Optionally, in another embodiment, the wireless charging and discharging device further includes:

a display unit, configured to: in the wireless charging receiving mode of the wireless charging and discharging device, if the feedback information of the electronic device is not received, control the wireless charging and discharging device to display first prompt information using a display screen, where the first prompt information is used to prompt a user whether to switch the electronic device from the wireless charging receiving mode to the wireless charging cradle mode; or in the wireless charging cradle mode of the wireless charging and discharging device, if the feedback information of the electronic device is not received, control the wireless charging and discharging device to display second prompt information using a display screen, where the second prompt information is used to prompt a user whether to switch the electronic device from the wireless charging cradle mode to the wireless charging receiving mode.

Optionally, in another embodiment, the first determining unit is specifically configured to:

when it is detected that a simulation ping value of the wireless charging and discharging device changes, determine that the electronic device wirelessly connected with the wireless charging and discharging device; or when it is detected that a level of a mechanical contact on the wireless charging and discharging device changes, determine that the electronic device wirelessly connected with the wireless charging and discharging device; or when it is detected that a level of a Hall component in the wireless charging and discharging device changes, determine that the electronic device wirelessly connected with the wireless charging and discharging device; or when a short-distance communication module of the wireless charging and discharging device detects that a device connected with the wireless charging and discharging device, determine that the electronic device wirelessly connected with the wireless charging and discharging device.

Optionally, in another embodiment, the wireless charging and discharging device further includes:

a sending unit, configured to: in a process of charging the wireless charging and discharging device using the wireless charging cradle device, send status information of the wireless charging and discharging device to the wireless charging cradle device according to a preset wireless charging communication protocol, so that the wireless charging cradle device adjusts, based on the status information of the wireless charging and discharging device, output power for charging the wireless charging and discharging device, where the status information of the wireless charging and discharging device includes at least one of the following: a quantity of electricity, a charging current, a battery voltage, and temperature information of the wireless charging and discharging device; or the wireless charging and discharging device further includes:

a sending unit, configured to: in a process of providing charging current to the wireless charging receiving device, receive, according to a preset wireless charging communication protocol, status information of the electronic device sent by the wireless charging receiving device, where the status information of the wireless charging receiving device includes at least one of the following: a quantity of electricity, a charging current, a battery voltage, and temperature information of the wireless charging receiving device; and an adjustment unit, configured to adjust, based on the status information of the wireless charging receiving device, output power to provide charging current to the wireless charging receiving device.

Optionally, in another embodiment, the charging unit is specifically configured to receive, using the first antenna, charging electric energy provided by the wireless charging cradle device, to charge the wireless charging and discharging device; and the discharging unit is specifically configured to provide charging current to the wireless charging receiving device using the second antenna.

Optionally, in another embodiment, the first antenna and the second antenna are a same antenna.

It should be understood that the wireless charging and discharging device 600 shown in FIG. 6 can implement various processes of the wireless charging/discharging method in the method embodiments in FIG. 1 to FIG. 5. The operations and/or functions of modules in the wireless charging and discharging device 600 are separately used to implement corresponding procedures in the method embodiments in FIG. 1 to FIG. 5. For details, refer to the descriptions in the foregoing method embodiments. To avoid repetition, detailed descriptions are properly omitted herein.

Figure 7:
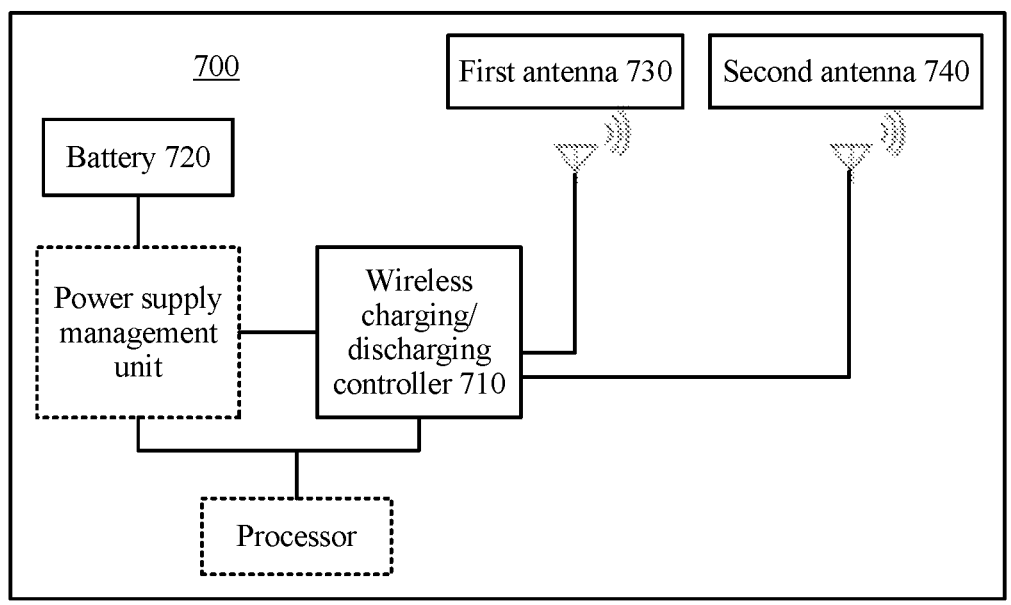
FIG. 7 is a schematic block diagram of a charging and discharging device according to another embodiment of the present invention.

FIG. 7 is a schematic structural diagram of a wireless charging and discharging device according to an embodiment of the present invention. As shown in FIG. 7, the wireless charging and discharging device 700 includes a wireless charging/discharging controller 710, a battery 720, a first antenna 730, and a second antenna 740.

The wireless charging/discharging controller is configured to determine that an electronic device wirelessly connected with the wireless charging and discharging device.

The wireless charging/discharging controller is further configured to: when the electronic device is a wireless charging cradle device, in a wireless charging receiving mode of the wireless charging and discharging device, receive, using the first antenna, charging electric energy provided by the wireless charging cradle device, to charge the battery of the wireless charging and discharging device.

The wireless charging/discharging controller is further configured to: when the electronic device is a wireless charging receiving device, in a wireless charging cradle mode of the wireless charging and discharging device, provide charging current to the electronic device using the second antenna.

Optionally, the wireless charging/discharging controller 710 may control charging/discharging of the battery 720 by controlling a power supply management unit.

It should be understood that the power supply management unit may be an independent management unit, or may be a same unit as the wireless charging/discharging controller 710, and the wireless charging/discharging controller 710 may be an independent control unit, or may be a same unit as a processor of the wireless charging and discharging device.

It should be further understood that the first antenna 730 and the second antenna 740 may be two independent antennas, or may be a same antenna. This embodiment of the present invention is not limited thereto.

In this embodiment of the present invention, the charging and discharging device may be used both as a wireless charging receiving device to receive electric energy provided by a wireless charging cradle device, and as a wireless charging cradle device to charge an external wireless charging receiving device, namely, support a reverse wireless charging function. Therefore, the method in this embodiment of the present invention can resolve the prior-art problem and improve user experience.

It should be understood that the first antenna and the second antenna in this embodiment of the present invention are wireless electromagnetic induction channels. When the wireless charging and discharging device is in the wireless charging receiving mode, the second antenna is used to receive energy radiated from a wireless charging cradle device. When the wireless charging and discharging device is in the wireless charging cradle mode, the first antenna is used to radiate energy to an external device. In addition, the first antenna and the second antenna in this embodiment of the present invention are also used to transmit a communication signal. When the first antenna and the second antenna are a same antenna, the antenna is multiplexed in a time-division manner; when the wireless charging and discharging device is in the wireless charging receiving mode, is used to receive energy radiated from a wireless charging cradle; and when the wireless charging and discharging device is in the wireless charging cradle mode, is used to radiate energy to an external device.

It should be understood that the wireless charging/discharging controller controls a wireless charging process, has a main function of using a wireless charging protocol to control communication between a mobile phone and a charging cradle or a wristband, for example, determining access of an electronic device and identifying a type of the electronic device. The wireless charging/discharging controller is further configured to perform energy conversion based on different modes of a mobile phone. The energy conversion function mainly means converting, when the wireless charging and discharging device is in the wireless charging receiving mode, wireless energy received by a wireless charging antenna into direct current power that can be used by the power supply management unit, and converting, when the wireless charging and discharging device is in the wireless charging cradle mode, direct current power provided by the power supply management unit into wireless energy that can be radiated from the wireless charging antenna. The wireless charging/discharging controller is further configured to control transmit power. Specifically, when the wireless charging and discharging device is in the wireless charging cradle mode, the wireless charging/discharging controller controls modulation power based on information reported by the electronic device, so as to control output power.

It should be understood that the power supply management unit is configured to: when the wireless charging and discharging device is in the wireless charging receiving mode, convert direct current power output by the wireless charging/discharging controller into electric energy that can be received by the battery and that is to be stored in the battery, and control a charging current, a charging voltage, a charging temperature, and a battery level; and when the wireless charging and discharging device is in the charge cradle mode, boost the battery voltage to a voltage at which the wireless charging/discharging controller can work, and adjust an output voltage and an output current based on a wristband power requirement transferred by the wireless charging/discharging controller.

It should be understood that, in actual application, the power supply management unit may be independently disposed or may be integrated into the wireless charging/discharging controller depending on system complexity or solutions. This is not limited in this embodiment of the present invention.

The battery is used as an energy storage module. When the wireless charging and discharging device is in the wireless charging receiving mode, the battery is charged using the wireless charging antenna, the wireless charging/discharging controller, and the power supply management unit, and when the wireless charging and discharging device is in the wireless charging cradle mode, energy is radiated using the power supply management unit, the wireless charging/discharging controller, and the wireless charging antenna.

It should be understood that, in this embodiment of the present invention, the processor is mainly used to control a working status of the power supply management unit and the wireless charging/discharging controller based on an overall status of the wireless charging and discharging device system, coordinate the working status of the entire system, and provide a UI interface so that a user can manually control the wireless charging and discharging device. It should be understood that, in this embodiment of the present invention, the processor is not a mandatory module, and a function of the processor may be implemented in the power supply management unit or the wireless charging/discharging controller. This embodiment of the present invention is not limited thereto.

It should be understood that in this embodiment of the present invention, for a process in which the wireless charging/discharging controller 710 controls the wireless charging and discharging device to perform charging or discharging, refer to the foregoing corresponding descriptions in FIG. 1 to FIG. 5. Detailed descriptions are properly omitted herein.

Optionally, in another embodiment, in terms of determining that the electronic device connected with the wireless charging and discharging device, the wireless charging/discharging controller is specifically configured to:

when it is detected that a simulation Packet Internet Groper ping value of the wireless charging and discharging device changes, determine that the electronic device connected with the wireless charging and discharging device; or when it is detected that a level of a mechanical contact on the wireless charging and discharging device changes, determine that the electronic device connected with the wireless charging and discharging device; or when it is detected that a level of a Hall component in the wireless charging and discharging device changes, determine that the electronic device connected with the wireless charging and discharging device; or when a short-distance communication module of the wireless charging and discharging device detects that a device connected with the wireless charging and discharging device, determine that the electronic device connected with the wireless charging and discharging device.

Optionally, in another embodiment, after determining that the electronic device wirelessly connected with the wireless charging and discharging device, the wireless charging/discharging controller is further configured to:

determine a type of the electronic device.

Optionally, in another embodiment, in terms of determining the type of the electronic device, the wireless charging/discharging controller is specifically configured to:

determine the type of the electronic device based on received device information sent by the electronic device in a short-distance communication manner; or in the wireless charging receiving mode of the wireless charging and discharging device, send device information of the wireless charging and discharging device to the electronic device, and if feedback information of the electronic device is received, determine that the electronic device is a wireless charging cradle device; or in the wireless charging cradle mode of the wireless charging and discharging device, if device information fed back by the electronic device is received, determine that the electronic device is a wireless charging receiving device.

Optionally, in another embodiment, after the device information of the wireless charging and discharging device is sent to the electronic device in the wireless charging receiving mode of the wireless charging and discharging device, if the feedback information of the electronic device is not received, in terms of determining the type of the electronic device, the wireless charging/discharging controller is further configured to:

switch the wireless charging and discharging device to the wireless charging cradle mode, and if the device information fed back by the electronic device is received using the second antenna, determine that the electronic device is a wireless charging receiving device; or in the wireless charging cradle mode of the wireless charging and discharging device, if the feedback information of the electronic device is not received, in terms of determining the type of the electronic device, the wireless charging/discharging controller is further configured to:

switch the wireless charging and discharging device to the wireless charging receiving mode, send the device information of the wireless charging and discharging device to the electronic device using the first antenna, and if the feedback information of the electronic device is received, determine that the electronic device is a wireless charging cradle device.

Optionally, in another embodiment, the wireless charging and discharging device further includes a display screen.

In the wireless charging receiving mode of the wireless charging and discharging device, if the feedback information of the electronic device is not received, the wireless charging/discharging controller is further configured to:

control the wireless charging and discharging device to display first prompt information using the display screen, where the first prompt information is used to prompt a user whether to switch the electronic device from the wireless charging receiving mode to the wireless charging cradle mode; or in the wireless charging cradle mode of the wireless charging and discharging device, if the feedback information of the electronic device is not received, the wireless charging/discharging controller is further configured to:

control the wireless charging and discharging device to display second prompt information using the display screen, where the second prompt information is used to prompt a user whether to switch the electronic device from the wireless charging cradle mode to the wireless charging receiving mode.

Optionally, in another embodiment, in a process of charging the wireless charging and discharging device using the wireless charging cradle device, the wireless charging/discharging controller is further configured to:

send status information of the wireless charging and discharging device to the wireless charging cradle device according to a preset wireless charging communication protocol, so that the wireless charging cradle device adjusts, based on the status information of the wireless charging and discharging device, output power for charging the charging and discharging device, where the status information of the wireless charging and discharging device includes at least one of the following: a quantity of electricity, a charging current, a battery voltage, and temperature information of the wireless charging and discharging device; or in a process of providing charging current to the wireless charging receiving device, the wireless charging/discharging controller is further configured to:

receive, according to a preset wireless charging communication protocol, status information of the wireless charging receiving device sent by the wireless charging receiving device, where the status information of the wireless charging receiving device includes at least one of the following: a quantity of electricity, a charging current, a battery voltage, and temperature information of the wireless charging receiving device; and adjust, based on the status information of the electronic device, output power to provide charging current to the wireless charging receiving device.

Therefore, in this embodiment of the present invention, the charging and discharging device may be used both as a wireless charging receiving device to receive electric energy provided by a wireless charging cradle device, and as a wireless charging cradle device to charge an external wireless charging receiving device, namely, support a reverse wireless charging function. Therefore, the method in this embodiment of the present invention can resolve the prior-art problem and improve user experience.

Figure 8:
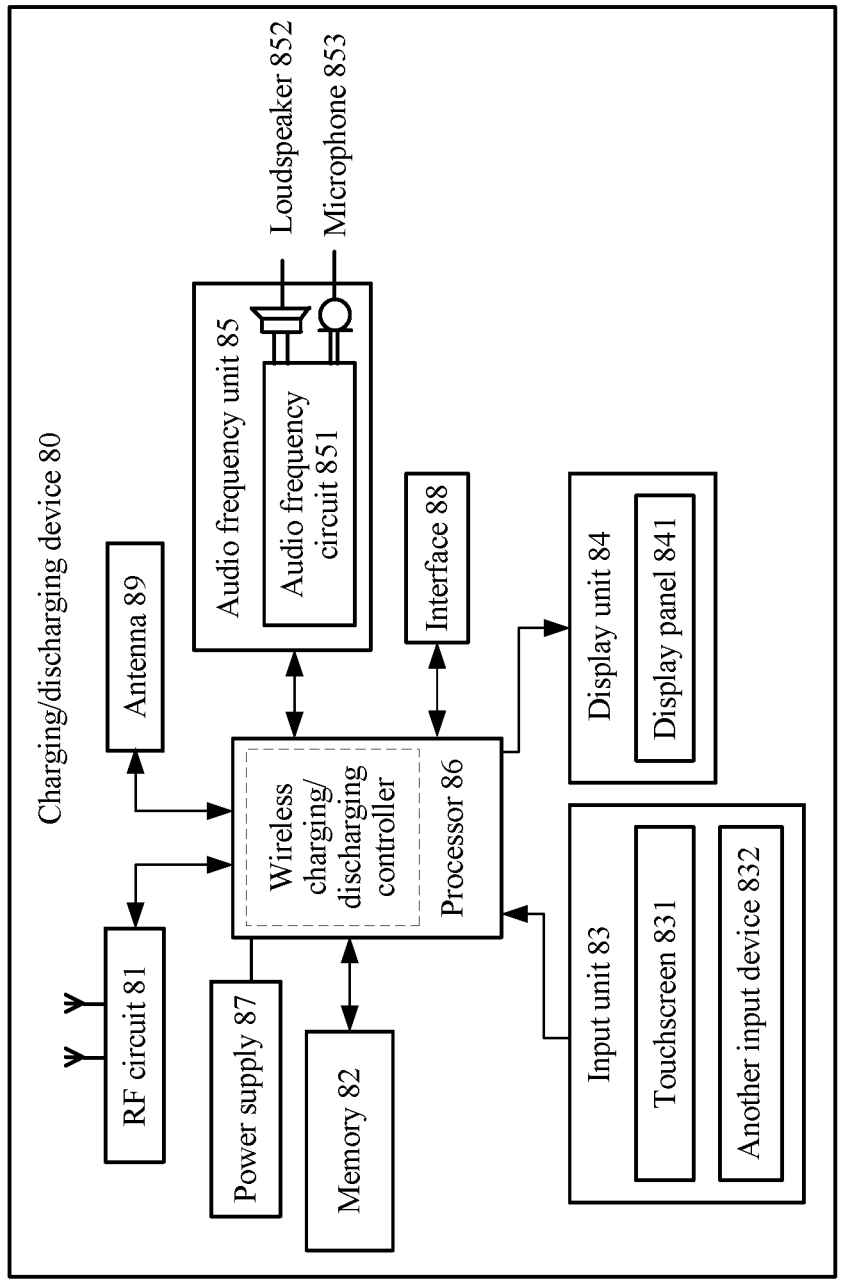
FIG. 8 is a schematic block diagram of a charging and discharging device according to another embodiment of the present invention.

FIG. 8 is a schematic block diagram of a charging and discharging device 800 according to an embodiment of the present invention. The wireless charging and discharging device 800 may be configured to implement the foregoing method implemented in the embodiments of the present invention shown in FIG. 1 to FIG. 5. For ease of description, only a part related to this embodiment of the present invention is shown. For undisclosed technical details, refer to the embodiments of the present invention shown in FIG. 1 to FIG. 5.

The mobile terminal may include a computer, a smartphone, a game console, a wearable device, a portable Android device (Portable Android Device, "PAD" for short), a portable device, a wireless mobile power supply (Mobile Power Pack, MPP) (which may also be referred to as a mobile power pack or a travel charger) that has a wireless charging/discharging function, or the like, provided that the wireless charging and discharging device can be charged wirelessly and can wirelessly charge another electronic device. This embodiment of the present invention is not limited thereto.

In this embodiment of the present invention, an example in which the mobile terminal is a mobile phone is used for description. FIG. 8 is a block diagram of a partial structure of the charging and discharging device 800 related to the embodiments of the present invention.

As shown in FIG. 8, the charging and discharging device 800 includes components such as a radio frequency (Radio Frequency, RF) circuit 81, a memory 82, an input unit 83, a display unit 84, an audio frequency unit 85, a processor 86, a power supply 87, an interface 88, and an antenna 89. A person skilled in the art may understand that, the structure of the terminal device shown in FIG. 8 does not constitute a limitation on the terminal device, and the terminal device may specifically include components more or fewer than those shown in FIG. 8, or combine some components, or have different components arranged at different positions.

The processor 86 is configured to: determine that an electronic device connected with the wireless charging and discharging device, where an electronic device is a wireless charging cradle device or a wireless charging receiving device; and when the electronic device is a wireless charging cradle device, in a wireless charging receiving mode of the wireless charging and discharging device, receive, using the antenna 89, charging electric energy that is provided by the electronic device for a battery of the wireless charging and discharging device; and when the electronic device is a wireless charging receiving device, in a wireless charging cradle mode of the wireless charging and discharging device, output, using the antenna 89, electric energy of the battery of the wireless charging and discharging device to the electronic device.

Therefore, in this embodiment of the present invention, the charging and discharging device may be used both as a wireless charging receiving device to receive electric energy provided by a wireless charging cradle device, and as a wireless charging cradle device to charge an external wireless charging receiving device, namely, support a reverse wireless charging function. Therefore, the method in this embodiment of the present invention can resolve the prior-art problem and improve user experience.

It should be understood that the processor 86 may control the charging and discharging device using a wireless charging/discharging controller, to perform charging or discharging. The wireless charging/discharging controller may be an independent control unit, or may be a same unit as the processor 86. In FIG. 8, that the wireless charging/discharging controller and the processor 86 are a same unit is used as an example for description. However, this embodiment of the present invention is not limited thereto.

It should be further understood that the antenna 89 may include a first antenna and a second antenna. When the wireless charging and discharging device is in the wireless charging receiving mode, the second antenna may be used to receive energy radiated from the wireless charging cradle device, and when the wireless charging and discharging device is in the wireless charging cradle mode, the first antenna may be used to radiate energy to an external device.

The antenna 89 may alternatively include one antenna, that is, the first antenna and the second antenna are a same antenna. In this case, the antenna 89 is multiplexed in a time-division manner, and when the wireless charging and discharging device is in the wireless charging receiving mode, the antenna 89 receives energy radiated from the wireless charging cradle device. When the wireless charging and discharging device is in the wireless charging cradle mode, the antenna 89 radiates energy to an external device.

It should be understood that, in this embodiment of the present invention, the radio frequency circuit 81 may be configured to receive and send a signal during an information receiving and sending process or a call process, and in particular, after receiving a downlink signal, transmit the downlink signal to the processor 86 for processing, and in addition, transmit an uplink signal. Usually, the radio frequency circuit 81 includes but is not limited to an antenna, at least one amplifier, a transceiver, a coupler, a low noise amplifier (Low Noise Amplifier, "LNA" for short), and a duplexer.

The radio frequency circuit 81 may further include a short-distance communication module, for example, a Wireless Fidelity (Wireless Fidelity, "WiFi" for short) module, a Bluetooth module, an infrared module, or an NFC module. Details are not described herein in this embodiment of the present invention.

The charging and discharging device 800 may communicate with the electronic device using internationally universal standards such as the Wireless Power Consortium (Wireless Power Consortium, WPC) standard (which may also be referred to as the Qi standard), A4WP, and PMA (Power Matters Alliance) standard.

In addition, the charging and discharging device 800 may communicate with a network and another device through wireless communication. Any communication standard or protocol may be used for the wireless communication, and includes but is not limited to a Global System for Mobile Communications (Global System for Mobile Communications, "GSM" for short), a general packet radio service (General Packet Radio Service, "GPRS" for short), Code Division Multiple Access (Code Division Multiple Access, "CDMA" for short), Wideband Code Division Multiple Access (Wideband Code Division Multiple Access, "WCDMA" for short), Long Term Evolution (Long Term Evolution, "LTE" for short), WiFi, Bluetooth, infrared, NFC, an email, or a short message service (Short Message Service, "SMS" for short).

The memory 82 may be configured to store computer executable program code, and the program code includes an instruction. When the processor executes the instruction, the instruction enables the electronic device to perform the foregoing method in the embodiments of the present invention shown in FIG. 1 to FIG. 5. The memory 82 may mainly include a program storage area and a data storage area. The program storage area may store an operating system of a smartphone, an instruction required by at least one function (such as an instruction required by an information input function, such as an instruction for applying an input method, an instruction for a sound playing function, and an instruction for an image playing function), and the like. The data storage area may store data (such as a word library, audio data, image data, or an address book that is created in a process of using an input method by a user) created based on use of a smartphone or the like. In addition, the memory 82 may include a high-speed random access memory, and may further include a nonvolatile memory, such as at least one magnetic disk storage component, a flash memory component, or another volatile solid-state storage component.

The input unit 83 may be configured to: receive input digital or character information, and generate key signal input related to user setting and function control of the terminal device. Specifically, the input unit 83 may include a touchscreen 831 and another input device 832. The touchscreen 831 is also referred to as a touch panel and may collect a touch operation performed by the user on or near the touchscreen (such as an operation performed by the user on the touchscreen 831 or near the touchscreen 831 using any proper object or accessory, such as a finger or a stylus), and drive a corresponding connection apparatus based on a preset program. Optionally, the touchscreen 831 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 86, and can receive and execute a command sent by the processor 86. In addition, the touchscreen 831 may be implemented using a plurality of types such as a resistive type, a capacitive type, an infrared ray, and a surface acoustic wave. The another input device 832 may include but is not limited to one or more of a physical keyboard, a function key (such as a volume control key or an on/off key), a trackball, a mouse, and a joystick.

The display unit 84 may be configured to display information entered by the user or information provided to the user and various menus of the wireless charging and discharging device. The display unit 84 may include a display panel 841. Optionally, the display panel 841 may be configured in a form such as a liquid crystal display (Liquid Crystal Display, "LCD" for short) or an organic light-emitting diode (Organic Light-emitting Diode, "OLED" for short). Further, the touchscreen 831 may cover the display panel 841. After detecting the touch operation on or near the touchscreen 831, the touchscreen 831 transmits the touch operation to the processor 86 to determine a type of a touch event, and then the processor 86 provides corresponding visual output on the display panel 841 based on the type of the touch event. In FIG. 19, the touchscreen 831 and the display panel 841 are used as two independent components to implement input and output functions of the smartphone. However, in some embodiments, the touchscreen 831 and the display panel 841 may be integrated to implement the input and output functions of the wireless charging and discharging device.

The audio frequency unit 85 includes an audio frequency circuit 851, a loudspeaker 852, and a microphone 853. The audio frequency unit 85 may provide an audio interface between the user and the wireless charging and discharging device. The audio frequency circuit 851 may receive audio data, convert the audio data into an electrical signal, and transmit the electrical signal to the loudspeaker 852, and the loudspeaker 852 converts the electrical signal into a sound signal for output. In addition, the microphone 853 converts a collected sound signal into an electrical signal, and the audio frequency circuit 851 receives the electrical signal and converts the electrical signal into audio data, and then outputs the audio data to the radio frequency circuit 81, so as to send the audio data to, for example, another wireless charging and discharging device, or output the audio data to the memory 82 for further processing.

The processor 86 is a control center of the wireless charging and discharging device, is connected to all parts of the entire wireless charging and discharging device using various interfaces and lines, and executes various functions of the wireless charging and discharging device and processes data by running or executing a software program and a module stored in the memory 82 and by invoking data stored in the memory 82, so as to complete corresponding functions of the wireless charging and discharging device. Optionally, the processor 86 may include one or more processing units. The processor 86 may integrate an application processor and a modem processor. The application processor mainly processes an operating system, a user interface, an application, and the like, and the modem processor mainly processes wireless communication. It may be understood that the modem processor may not be integrated into the processor 86.

The wireless charging and discharging device further includes the power supply 87 (such as a battery) that supplies power to each component. Preferably, the power supply may be logically connected to the processor 86 using a power supply management system, so as to implement functions such as charging management, discharging management, and power consumption management using the power supply management system.

The interface 88 may be configured to: connect to another device, and transmit data between the wireless charging and discharging device and the another device. The interface 88 may be a wired connection interface, or may be a wireless connection interface.

It should be understood that the charging and discharging device 80 according to this embodiment of the present invention may correspond to the wireless charging and discharging device 600 and the wireless charging and discharging device 700 in the embodiments of the present invention, and may correspondingly perform the steps in the method embodiments of the present invention. For brevity, details are not described herein again.

It should be understood that in the embodiment of the present invention, the processor in the foregoing apparatus may be a central processing unit (Central Processing Unit, CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor or the processor may be any normal processor, or the like.

A person of ordinary skill in the art may understand that all or some of the steps of the embodiment methods may be implemented by hardware or a program instructing relevant hardware. The program may be stored in a computer-readable storage medium. When the program runs, all or some steps in the methods of the embodiments shown in FIG. 1 to FIG. 5 are performed. The storage medium may be a read-only memory, a magnetic disk, an optical disc, or the like.

It should be understood that "one embodiment" or "an embodiment" mentioned in the whole specification does not mean that particular features, structures, or characteristics related to the embodiment are included in at least one embodiment of the present invention. Therefore, "in one embodiment" or "in an embodiment" appearing throughout the specification does not necessarily mean a same embodiment. In addition, these particular features, structures, or characteristics may be combined in one or more embodiments using any appropriate manner. It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of the present invention, "B corresponding to A" indicates that B is associated with A, and B may be determined based on A. However, it should be further understood that determining A based on B does not mean that B is determined based on A only; namely, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a non-volatile computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and disc (disc) used by the present invention includes a compact disc (CD), a laser disc, an optical disc, a digital versatile disc (DVD), a floppy disk and a Blu-ray disc. The disk usually copies data by a magnetic means, and the disc copies data optically by a laser means. The foregoing combination should also be included in the protection scope of the computer-readable medium.

In summary, the foregoing descriptions are merely example embodiments of the technical solutions of the present invention, but are not intended to limit the protection scope of the embodiments of the present invention. Any modification, equivalent replacement, or improvement made without departing from the spirit and principle of the embodiments of the present invention shall fall within the protection scope of the embodiments of the present invention.

What is claimed is:

1. A wireless charging and wireless discharging method, wherein the method is applied to a first electronic device, wherein the method comprises:
    determining, by the first electronic device, that a second electronic device is wirelessly connected with the first electronic device;
    in response to determining that the second electronic device is wirelessly connected with the first electronic device, determining a mode of the first electronic device and a type of the second electronic device, the first electronic device being configured to switch between a wireless charging receiving mode and a wireless charging cradle mode based on a determination of the type of the second electronic device;
    charging the first electronic device using the second electronic device when the first electronic device is in the wireless charging receiving mode and when the second electronic device is a wireless charging cradle device; and
    providing charging current from the first electronic device to the second electronic device to charge the second electronic device when the first electronic device is in the wireless charging cradle mode and when the second electronic device is a wireless charging receiving device.

2. The method of claim 1, wherein the determining a type of the second electronic device comprises at least one of:
    determining the type of the second electronic device based on a received device information of the second electronic device sent from the second electronic device; or
    sending device information of the first electronic device to the second electronic device in response to determining that the first electronic device is in the wireless charging receiving mode, and determining that the second electronic device is a wireless charging cradle device in response to receiving a feedback information from the second electronic device; or
    determining that the second electronic device is a wireless charging receiving device, in the wireless charging cradle mode of the first electronic device, in response to receiving a device information of the second electronic device from the second electronic device.

3. The method of claim 2, wherein:
    in response to failing to receive a feedback information from the second electronic device after the device information of the first electronic device is sent to the second electronic device, in the wireless charging receiving mode of the first electronic device, the determining a type of the second electronic device further comprises:
    switching the first electronic device to the wireless charging cradle mode; and
    determining that the second electronic device is a wireless charging receiving device in response to receiving the device information of the second electronic device from the second electronic device using a second antenna; or
    in response to failing to receive a device information of the second electronic device, in the wireless charging cradle mode of the first electronic device, the determining a type of the second electronic device further comprises:
    switching the first electronic device to the wireless charging receiving mode;
    sending the device information of the first electronic device to the second electronic device using a first antenna; and
    determining that the second electronic device is a wireless charging cradle device when receiving the feedback information from the second electronic device.

4. The method of claim 2, wherein:
    in response to failing to receive the feedback information from the second electronic device, in the wireless charging receiving mode of the first electronic device, the method further comprises:
    controlling the first electronic device to display first prompt information using a display screen, wherein the first prompt information is used to prompt a user to switch the first electronic device from the wireless charging receiving mode to the wireless charging cradle mode; or in response to failing to receive the device information of the second electronic device from the second electronic device, in the wireless charging cradle mode of the first electronic device, the method further comprises:

controlling the first electronic device to display second prompt information using a display screen, wherein the second prompt information is used to prompt a user to switch the first electronic device from the wireless charging cradle mode to the wireless charging receiving mode.

5. The method of claim 1, wherein the determining that a second electronic device wirelessly is connected with the first electronic device comprises:

in response to a detection that a simulation ping value of the first electronic device changes, determining that the second electronic device is wirelessly connected with the first electronic device; or in response to a detection that a voltage level of a mechanical contact on the first electronic device changes, determining that the second electronic device is wirelessly connected with the first electronic device; or in response to a detection that a level of a Hall component in the first electronic device changes, determining that the second electronic device is wirelessly connected with the first electronic device; or in response to a detection that a device connected with the first electronic device using a short-distance communication module of the first electronic device, determining that the second electronic device is wirelessly connected with the first electronic device.

6. The method of claim 1, wherein:

in a process of charging the first electronic device using the second electronic device, the method further comprises:

sending status information of the first electronic device to the second electronic device according to a preset wireless charging communication protocol, wherein the second electronic device adjusts, based on the status information of the first electronic device, output power for charging the first electronic device, wherein the status information of the first electronic device comprises at least one of: a quantity of electricity of the first electronic device, a charging current of the first electronic device, a battery voltage of the first electronic device, or temperature information of the first electronic device; or in a process of providing charging current to the second electronic device, the method further comprises:

receiving, according to a preset wireless charging communication protocol, status information of the second electronic device sent by the second electronic device, wherein the status information of the second electronic device comprises at least one of: a quantity of electricity of the second electronic device, a charging current of the second electronic device, a battery voltage of the second electronic device, or temperature information of the second electronic device; and adjusting, based on the status information of the second electronic device, output power to provide charging current to the first electronic device.

7. The method of claim 1, wherein the charging the first electronic device using the second electronic device comprises:

receiving, using a first antenna, charging electric energy provided by the second electronic device, to charge the first electronic device; and wherein the providing charging current to the second electronic device comprises: providing charging current to the second electronic device using a second antenna.

8. The method of claim 7, wherein the first antenna and the second antenna are a same antenna.

9. A first electronic device, the first electronic device comprising:

at least one processor;

a non-transitory computer-readable storage medium coupled to the at least one processor and storing programming instructions for execution by the at least one processor, wherein the programming instructions instruct the at least one processor to:

determine that a second electronic device is wirelessly connected with the first electronic device;

in response to determining that the second electronic device is wirelessly connected with the first electronic device, determine a mode of the first electronic device and a type of the second electronic device, the first electronic device being configured to switch between a wireless charging receiving mode and a wireless charging cradle mode based on a determination of the type of the second electronic device;

instruct to charge the first electronic device using the second electronic device when the first electronic device is in the wireless charging receiving mode and when the second electronic device is a wireless charging cradle device; and instruct to provide charging current from the first electronic device to the second electronic device to charge the second electronic device when the first electronic device is in the wireless charging cradle mode and when the second electronic device is a wireless charging receiving device.

10. The first electronic device of claim 9, wherein the programming instructions further instruct the at least one processor to:

determine the type of the second electronic device based on a received device information of the second electronic device sent from the second electronic device; or determine that the second electronic device is a wireless charging cradle device in response to receiving a feedback information from the second electronic device after the first electronic device sent a device information of the first electronic device to the second electronic device when the first electronic device is in the wireless charging receiving mode; or determine that the second electronic device is a wireless charging receiving device, in the wireless charging cradle mode of the first electronic device, in response to receiving a device information of the second electronic device from the second electronic device.

11. The first electronic device of claim 10, wherein:

in response to failing to receive a feedback information from the second electronic device after the device information of the first electronic device is sent to the second electronic device, in the wireless charging receiving mode of the first electronic device, the programming instructions further instruct the at least one processor to:

determine that the second electronic device is a wireless charging receiving device in response to receiving the device information of the second electronic device from the second electronic device using a second antenna after the first electronic device is switched to the wireless charging cradle mode; or in response to failing to receive a device information of the second electronic device, in the wireless charging cradle mode of the first electronic device, the programming instructions further instruct the at least one processor to:
switch the first electronic device to the wireless charging receiving mode;
send the device information of the first electronic device to the second electronic device using a first antenna; and
determine that the second electronic device is a wireless charging cradle device in response to receiving the feedback information from the second electronic device.

12. The first electronic device of claim 10, wherein the first electronic device further comprises:
a display, the display configured to:
display first prompt information, wherein the first prompt information is used to prompt a user to switch the first electronic device from the wireless charging receiving mode to the wireless charging cradle mode; or
display second prompt information using a display screen, wherein the second prompt information is used to prompt a user to switch the first electronic device from the wireless charging cradle mode to the wireless charging receiving mode.

13. The first electronic device of claim 9, wherein the programming instructions further instruct the at least one processor to:
in response to a detection that a simulation ping value of the first electronic device changes, determine that the second electronic device is wirelessly connected with the first electronic device; or
in response to a detection that a voltage level of a mechanical contact on the first electronic device changes, determine that the second electronic device is wirelessly connected with the first electronic device; or
in response to a detection that a level of a Hall component in the first electronic device changes, determine that the second electronic device is wirelessly connected with the first electronic device; or
in response to a detection that a device connected with the first electronic device using a short-distance communication module of the first electronic device, determine that the second electronic device is wirelessly connected with the first electronic device.

14. The first electronic device of claim 9, wherein the programming instructions further instruct the at least one processor to:
send status information of the first electronic device to the second electronic device according to a preset wireless charging communication protocol, wherein the second electronic device adjusts, based on the status information of the first electronic device, output power for charging the first electronic device, wherein the status information of the first electronic device comprises at least one of: a quantity of electricity of the first electronic device, a charging current of the first electronic device, a battery voltage of the first electronic device, or temperature information of the first electronic device; or
receive, according to a preset wireless charging communication protocol, in a process of providing charging current to the wireless charging receiving device, status information of the second electronic device sent by the second electronic device, wherein the status information of the second electronic device comprises at least one of: a quantity of electricity of the second electronic device, a charging current of the second electronic device, a battery voltage of the second electronic device, or temperature information of the second electronic device; and
adjust, based on the status information of the second electronic device, output power to provide charging current to the second electronic device.

15. The first electronic device of claim 9, wherein the programming instructions further instruct the at least one processor to:
instruct to receive, using a first antenna, charging electric energy provided by the wireless charging cradle device, to charge the first electronic device; and
instruct to provide charging current to the wireless charging receiving device using a second antenna.

16. The first electronic device of claim 15, wherein the first antenna and the second antenna are a same antenna.

17. A first electronic device, the first electronic device comprising:
a controller, a battery, a first antenna, and a second antenna,
wherein the controller is configured to:
determine that a second electronic device is wirelessly connected with the first electronic device;
in response to determining that the second electronic device is wirelessly connected with the first electronic device, determine a mode of the first electronic device and a type of the second electronic device, the first electronic device being configured to switch between a wireless charging receiving mode and a wireless charging cradle mode based on a determination of the type of the second electronic device;
charge the first electronic device using the second electronic device when the first electronic device is in the wireless charging receiving mode and when the second electronic device is a wireless charging cradle device; and
provide charging current from the first electronic device to the second electronic device to charge the second electronic device when the first electronic device is in the wireless charging cradle mode and when the second electronic device is a wireless charging receiving device.

* * * * *